US010711910B2

(12) United States Patent
Shah

(10) Patent No.: US 10,711,910 B2
(45) Date of Patent: Jul. 14, 2020

(54) SOLENOID VALVE WITH INTEGRAL PRESSURE RELIEF ARRANGEMENT

(71) Applicant: ROTEX AUTOMATION LIMITED, Vadodara, Gujarat (IN)

(72) Inventor: Nirav R. Shah, Vadodara (IN)

(73) Assignee: ROTEX Automation Limited, Gujarat (IN)

( * ) Notice: Subject to any disclaimer, the term of this patent is extended or adjusted under 35 U.S.C. 154(b) by 2 days.

(21) Appl. No.: 16/149,168

(22) Filed: Oct. 2, 2018

(65) Prior Publication Data
US 2019/0101224 A1    Apr. 4, 2019

(30) Foreign Application Priority Data
Oct. 3, 2017  (IN) .............................. 201721035003

(51) Int. Cl.
| | |
|---|---|
| F16K 31/06 | (2006.01) |
| F16K 31/383 | (2006.01) |
| F16K 31/40 | (2006.01) |
| F15B 13/043 | (2006.01) |

(52) U.S. Cl.
CPC .......... F16K 31/06 (2013.01); F15B 13/0431 (2013.01); F16K 31/0675 (2013.01); F16K 31/383 (2013.01); F16K 31/408 (2013.01)

(58) Field of Classification Search
CPC .... F16K 31/06; F16K 31/0675; F16K 31/408; F16K 31/383; F15B 13/043; F15B 13/0431; F15B 13/0433

USPC ................ 251/129.15–129.22, 30.01–30.05; 335/281

See application file for complete search history.

(56) References Cited

U.S. PATENT DOCUMENTS

| | | | | |
|---|---|---|---|---|
| 4,102,526 A * | 7/1978 | Hargraves | ........... | F16K 31/0606 137/625.65 |
| 4,290,579 A * | 9/1981 | Pauliukonis | ........ | F16K 31/0655 251/129.21 |
| 4,623,118 A * | 11/1986 | Kumar | .................. | F15B 13/015 137/596.16 |
| 5,599,003 A * | 2/1997 | Seemann | ................ | H01F 7/124 251/129.2 |
| 6,076,550 A * | 6/2000 | Hiraishi | .............. | F16K 31/0655 137/550 |
| 6,425,409 B1 * | 7/2002 | Cross | .................. | F16K 31/0606 137/15.18 |

(Continued)

Primary Examiner — John Bastianelli

(57) ABSTRACT

A solenoid valve (100) comprising a solenoid assembly (104) and a dual valve assembly (102) for fluid flow control and pressure relief. The dual valve assembly (102) comprising a valve body (300), upper stopper ring (113) and a lower stopper ring (307). A flow arrangement (200) comprising, a primary moving assembly (240) and a secondary moving assembly (213) is disposed inside the valve body (300). The primary moving assembly (240) having a primary mover (230) and an O-ring holder (208). The secondary moving assembly (213) comprising a sliding member (215), a supporting ring (214), a pressure-relief spring (211) and a pressure-adjusting mechanism (205). The flow arrangement (200) moves up when a solenoid coil (103) is energized resulting in normal fluid flow, the secondary moving assembly (213) moves down under excessive fluid pressure with the solenoid coil (103) de-energized. A reverse fluid flow is facilitated under excessive fluid pressure.

20 Claims, 17 Drawing Sheets

(56) References Cited

U.S. PATENT DOCUMENTS

| | | | | |
|---|---|---|---|---|
| 6,457,697 B1* | 10/2002 | Kolze | .................. | F16K 31/404 |
| | | | | 251/30.02 |
| 6,540,204 B1* | 4/2003 | Carter | .................. | F16K 31/406 |
| | | | | 137/489.5 |
| 6,619,612 B2* | 9/2003 | Freisinger | .......... | G05D 16/2095 |
| | | | | 251/30.03 |
| 7,414,502 B2* | 8/2008 | Tackes | ................ | F16K 31/0668 |
| | | | | 251/129.15 |
| 7,841,412 B2* | 11/2010 | Jasser | .................. | E21B 23/006 |
| | | | | 166/319 |
| 7,921,880 B2* | 4/2011 | Jackson | ................ | F15B 11/042 |
| | | | | 137/881 |
| 8,960,638 B2* | 2/2015 | Da Pont | ................ | F16K 31/404 |
| | | | | 251/129.15 |

\* cited by examiner

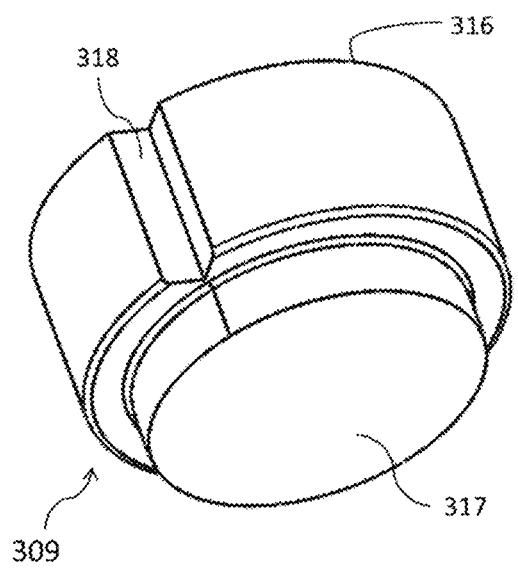 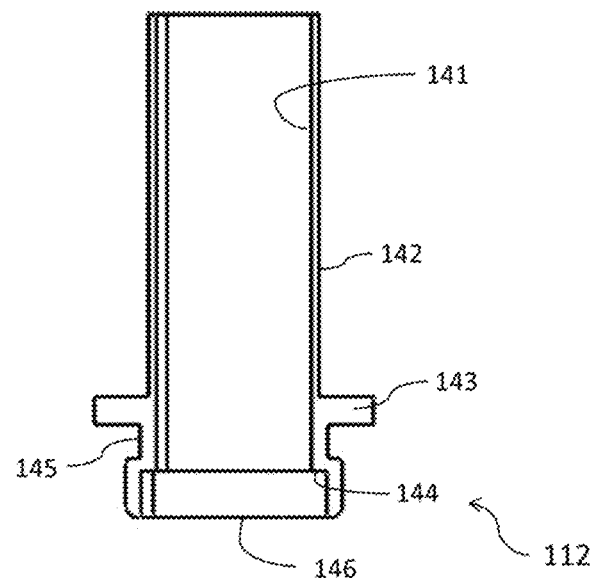
FIGURE - 2D                    FIGURE - 2E

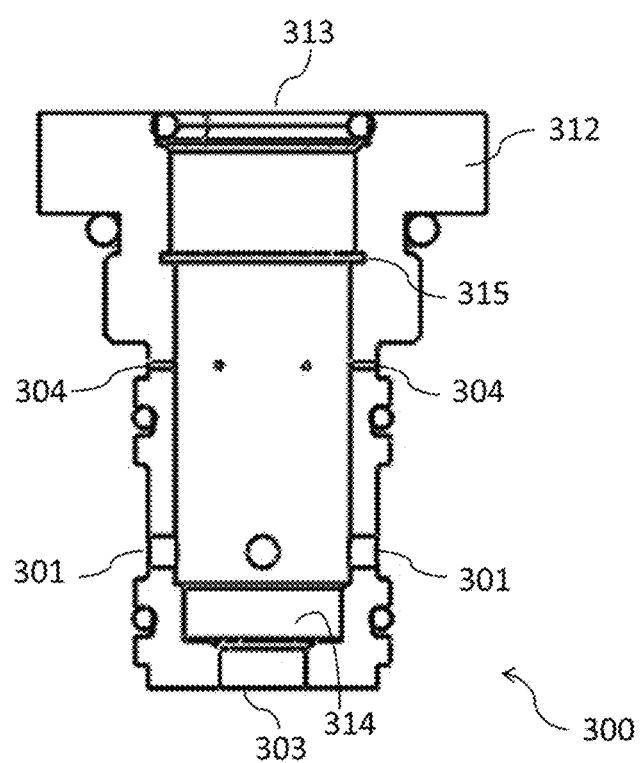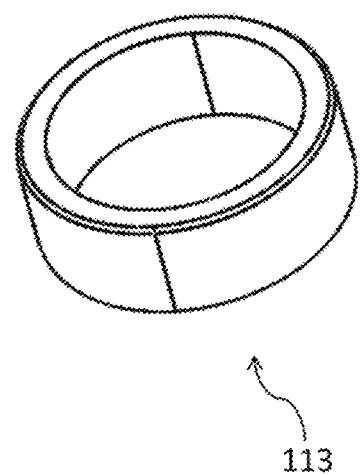
FIGURE - 3A
FIGURE - 3B

SOLENOID VALVE WITH INTEGRAL PRESSURE RELIEF ARRANGEMENT

The following specification particularly describes the invention and the manner in which it is to be performed.

CLAIM OF PRIORITY

This application claims priority to Indian Provisional Patent Application No. 201721035003 filed on Oct. 3, 2017, titled "SOLENOID VALVE WITH INTEGRAL PRESSURE LIMITING ARRANGEMENT".

FIELD OF INVENTION

The present invention relates to solenoid valves and more particularly to the solenoid valves with integral arrangement for release of excessive fluidic pressure.

BACKGROUND

Solenoid valves are used as control element in fluidic systems. The solenoid valve operates when a solenoid coil is energised by electricity. When the solenoid coil is energised, a magnetic field is created causing a plunger to linearly move, resulting in opening or closing of the valve.

Solenoid valves generally have a Normally Open (NO) and a Normally Closed (NC) position. In the Normally Closed (NC) position, the valve remains close while the solenoid coil is de-energised. When the solenoid coil is energised, the valve opens and fluid flows through the valve. When the valve is close, there is a prescribed fluidic pressure at an inlet side. There are industrial situations when there is a sudden rise in the fluidic pressure from an inlet side of the valve, above a pre-defined limit. If unchecked, there is a possibility of the valve or any element of the associated system getting damaged.

In an event of failure in electric supply to the solenoid coil or a solenoid coil open circuiting or short circuiting, the coil may stop functioning thus closing the valve and interrupting the fluid flow through the valve. This may also develop a high pressure at the inlet side of the valve.

The conventional method to solve such problem is to deploy a separate valve called as a pressure relief valve which is a safety valve to control the pressure in a system. Addition of separate valve increases the overall cost and maintenance of the system and reduces system's reliability. Without a pressure relief valve, the fluidic pressure can continue to grow until another component fails and pressure is released.

U.S. Pat. Nos. 5,992,450, 4,305,566, 3,903,919, 5,467,797 and 3,818,927 disclose the pressure relief operation when there is electric supply and do not address the issue of excessive pressure release when there is sudden rise in the fluidic pressure in absence of electrical supply to the solenoid valve.

Therefore, there is a need for a construction that overcomes the above mentioned loop holes.

OBJECTIVES

An objective of a present invention is to provide a solenoid valve with integral pressure relief arrangement.

Another objective of the present invention is to provide the solenoid valve with integral pressure relief arrangement that releases excessive fluid when there is sudden rise in a fluidic pressure.

Another objective of the present invention is to provide the solenoid valve with integral pressure relief arrangement that discharges excessive fluid in the absence of an electrical signal to the solenoid valve and ensure safety of the fluidic system.

Another objective of the present invention is to mitigate the necessity of deploying a separate safety valve with a solenoid valve in order to release the excessive fluidic pressure.

Another objective of the present invention is to provide the solenoid valve with integral pressure relief arrangement in which a relief pressure setting can be adjusted as per the application or system requirement.

Another objective of the present invention is to provide the solenoid valve with integral pressure relief arrangement that is capable of handling a reverse fluidic flow.

Yet another objective of the present invention is to provide a compact solenoid valve to provide higher fluid flow rate.

SUMMARY

A solenoid valve for fluid flow control and pressure relief comprises a solenoid assembly and a dual valve assembly. The solenoid assembly comprises a C-Core, an armature, a plunger with a reduced diameter zone, an inner flange, an outer flange, a first room, a second room, a plurality of longitudinal recesses and a transversal hole, having a plunger-spring, and a sealing seat with a constraining surface and a sealing surface. Further, it comprises a solenoid coil and a guide with an inner tubular wall, an outer tubular wall, a flange near an external end of the outer tubular wall, a groove on the outer side and a spring rest on the inner side towards the external end.

The dual valve assembly comprises a valve body having one or more inlet ports, one or more exhaust ports, an outlet port, an upper seat, and an outlet seat. Further, it comprises an upper stopper ring, a lower stopper ring with a protruded rim and a third part profile. A flow arrangement is disposed inside the valve body. The flow arrangement further comprises a primary moving assembly consists of a primary mover and an O-ring holder. The primary mover comprises a first bore, an exhaust bore, a tubular cavity, an engaging end, an annular groove to hold a sealing O-ring, a first part profile and plurality of raised surfaces. The O-ring holder comprises a partial cavity and a second part profile. A secondary moving assembly further comprises a sliding member, a supporting ring, a pressure-relief spring and a pressure-adjusting mechanism.

The guide extends from the solenoid assembly to the dual valve assembly. The first part profile of the primary mover, the second profile of the O-ring holder and the third part profile of the lower stopper ring along with an inside of the valve body forms a channel. The sealing O-ring butts on the protruded rim of the lower stopper ring and forms a sealing point. The tubular cavity of the primary mover houses the secondary moving assembly.

The flow arrangement moves up when the solenoid coil is energized resulting in normal fluid flow. The secondary moving assembly moves down under excessive fluid pressure with the solenoid coil de-energized, through the reduced diameter zone and the transversal hole in the plunger. The incoming fluid reaches the first room of the plunger and the incoming fluid pressure acting on the constraining surface of the sealing seat augments the force of a plunger-spring in keeping the inflow orifice sealed by the sealing surface of the sealing seat. The incoming fluid also reaches to a top of the plunger and exerts force on the mating end which helps in keeping the inflow orifice sealed by the sealing surface of the sealing seat. A disposition means provided on a first end of the valve body to mount the valve body on the external end of the guide to obtain the solenoid valve with integral pressure relief arrangement.

BRIEF DESCRIPTION OF DRAWINGS

FIGS. 2A-2F shows various parts of the solenoid valve.
FIGS. 3A-3C shows the parts of a dual valve assembly.

DETAILED DESCRIPTION

The present invention shall now be described with the help of drawings. It is to be noted that there are several variations possible to be made around the concept of this invention and the description of various embodiments given here below should not be construed to limit the invention in any manner. Several obvious steps of construction as well as operation are consciously not described in order not to lose focus from inventive steps.

Figure 1:
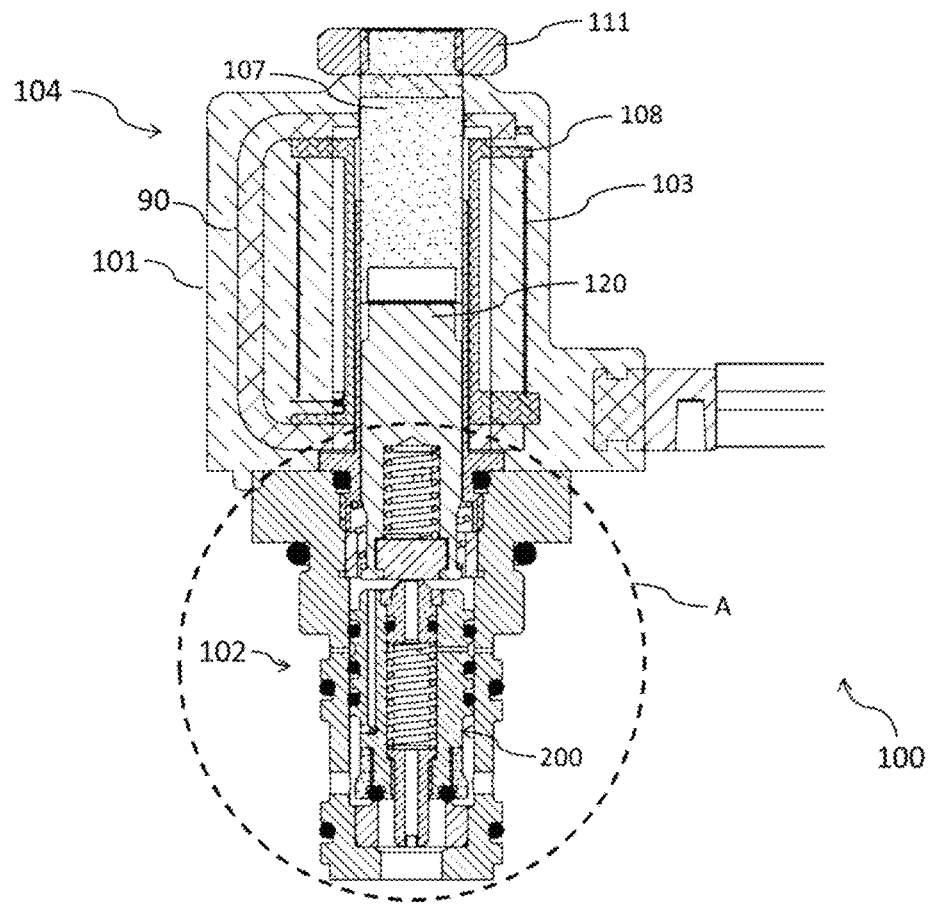
FIG. 1 is a sectional front view of a solenoid valve constructed in accordance with a present invention.

FIG. 1, a solenoid valve (100), in a Normally Closed (NC) position, comprising a solenoid assembly (104) and a dual valve assembly (102) (shown in dotted circle 'A').

The solenoid assembly (104) features an encapsulation (101) housing a magnetic path and a magnetizer. The magnetic path comprises a C-core (90) made of a ferromagnetic material, an armature (107) also made of a ferromagnetic material and a plunger (120), also made of a ferromagnetic material. The magnetizer comprises a solenoid coil (103) of a conducting wire, generally of copper, wound around an insulating spool (108). It is to be appreciated that while the term armature used in the context of solenoids refers generally to a movable core the armature (107) of the present application is a fixed core that is used in a fixed configuration as would be evident to a person skilled in the art on account of the armature (107) having a fixation means (118) on an outer surface (147), as shown in FIG. 2A, provided thereon for fixing the armature (107).

Figure 2A:
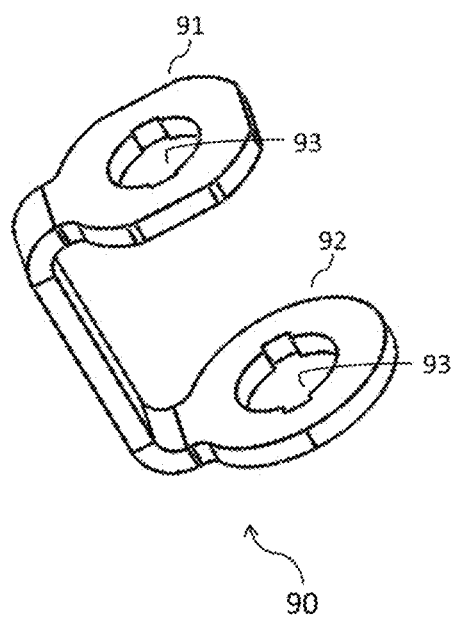
Figure 2B:
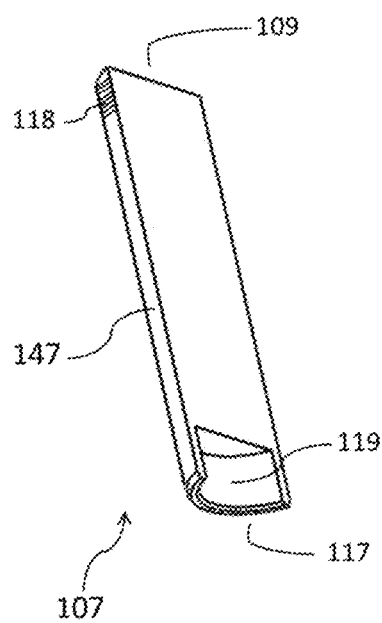
Figure 2C:
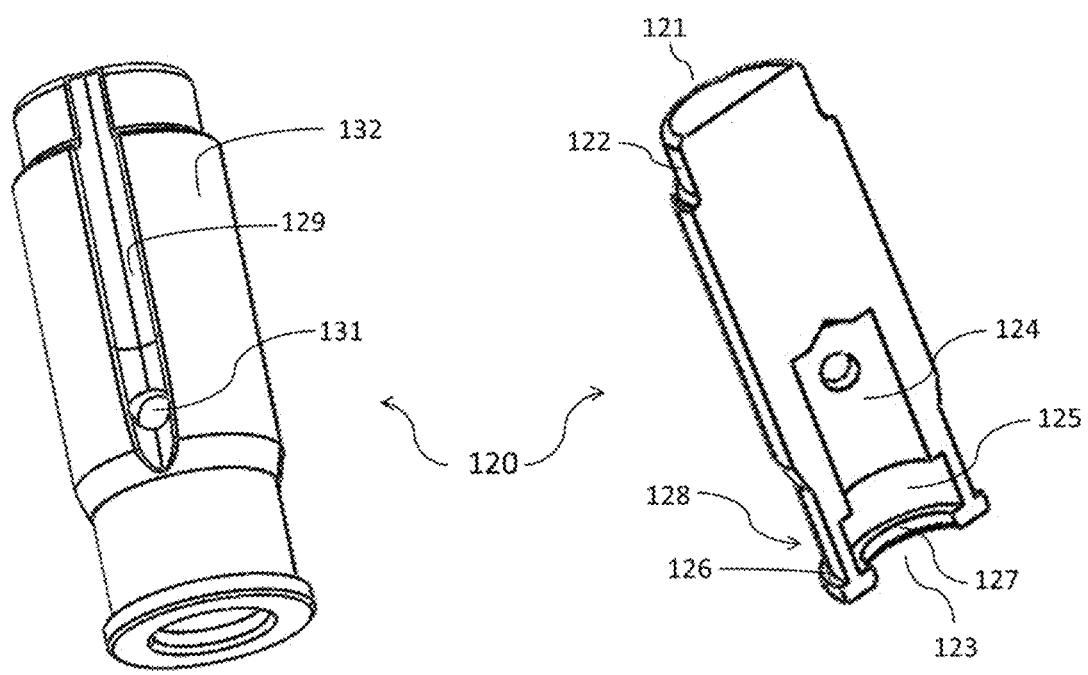

FIG. 2A, the C-core (90) has a passing hole (93) at a far end (91) and also at a near end (92). The armature (107) has a the fixation means (118) on an outer surface (147) at its outer end (109), and a room (119) at its inner end (117), FIG. 2B, FIG. 2C, the plunger (120) has a neck (122) on its mating end (121). There is provided an outer flange (126) and an inner flange (127). There is provided a reduced diameter zone (128) on an outside near an action end (123) of the plunger (120), while on an inside of the plunger (120) near the action end (123), there is provided a first room (124) and a second room (125). A transversal hole (131) connects the inside of the plunger (120) with the outside of the plunger (120). A plurality of longitudinal recesses (129) is provided on the outside of the plunger (120).

Figure 1A:
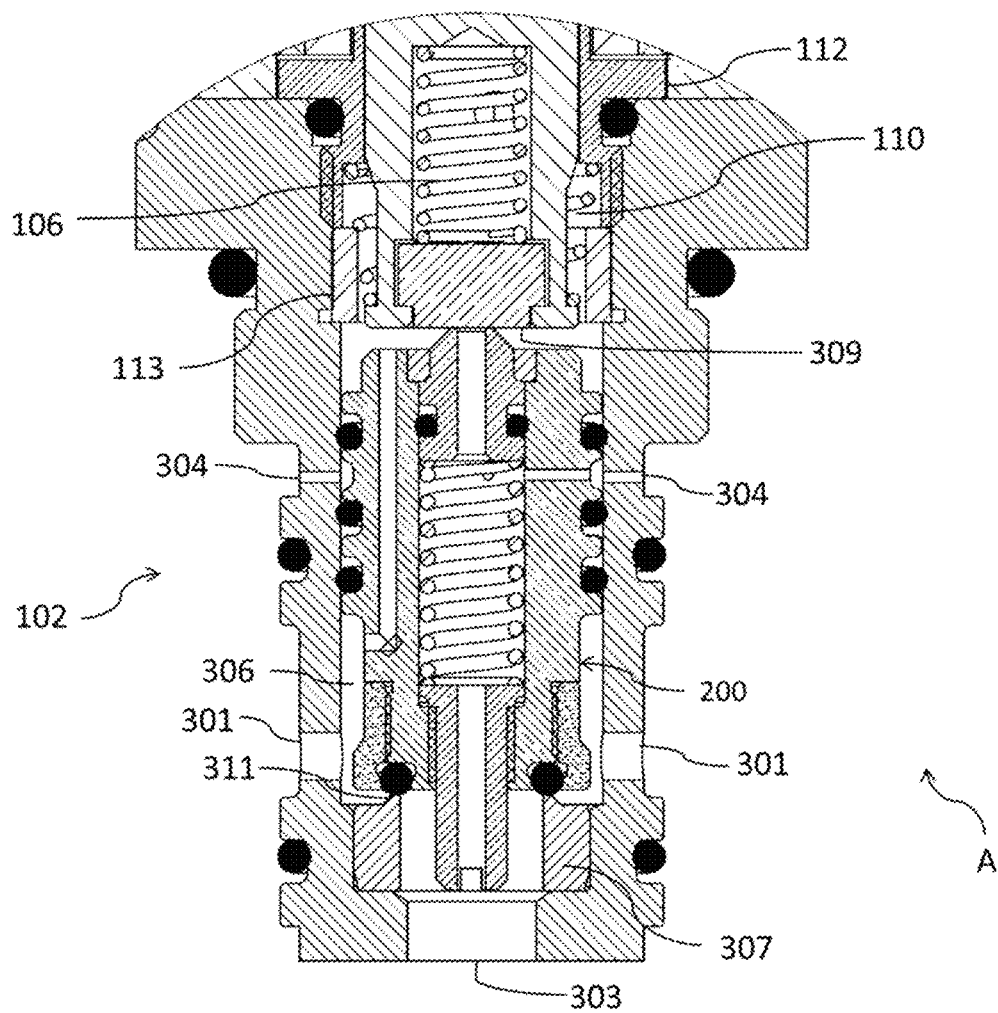
FIG. 1A is an enlarged view of a portion shown in a dotted circle 'A' in FIG. 1.

A plunger-spring (106), resides in the first room (124) of the plunger (120), pre-compressed by interference fitting a sealing seat (309) in the second room (125) of the plunger (120), the sealing seat (309) retained therein by the inner flange (127) of the plunger (120) as seen from the FIG. 1A. The sealing seat (309) is made of a rubber, whether natural or synthetic, of durometer scale hardness more than 40, and therefore fittable by elastic deformation. The sealing seat (309) has a constraining surface (316) and a sealing surface (317). There is provided an assembly relief (318) for facilitating elastic deformation, FIG. 2D.

FIG. 2E, there is provided a guide (112), which is a tubular nonmagnetic component. The guide (112) has an inner tubular wall (141) and an outer tubular wall (142). There is provided a flange (143) near an external end (146) of the outer tubular wall (142), a groove (145) on the outer side and a spring rest (144) on the inner side towards an external end (146). The guide (112) extends from the solenoid assembly (104) to the dual valve assembly (102) as seen from FIGS. 1 and 1A.

Figure 2F:
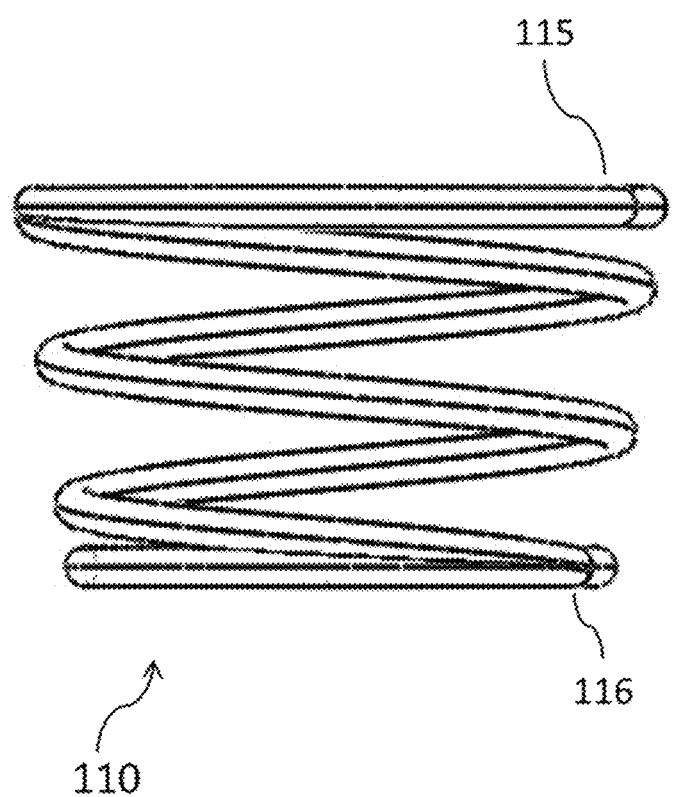

The armature (107) is assembled with the guide (112) by interference fit between the inner tubular wall (141) of the guide (112) and the outer surface (147) of the armature (107) and later through a permanent joint by performing welding operation. A fixation device (111) holds together the solenoid assembly (104) and the solenoid valve (100) in a rigid manner. The plunger (120) is slidably situated in the guide (112) such that the plunger (120) is always surrounded by the near end (92) of the C-Core (90). FIG. 2F, there is provided a varying diameter compression spring (110) around the reduced diameter zone (128) of the plunger (120) such that a largest diameter end (115) of the varying diameter compression spring (110) is slid onto the plunger (120) from the action end (123) of the plunger (120) while a smallest diameter end (116) of the varying diameter compression spring (110) is elastically widened and made to slide over the outer flange (126) and allowed to rest thereon. When the plunger (120) is situated in the guide (112), the largest diameter end (115) of the varying diameter compression spring (110) sits on the spring rest (144) of the guide (112) as seen from FIGS. 1 and 1A.

When the solenoid coil (103) is de-energized, the sealing seat (309) is required to effectively seal the inflow orifice (201). Through the reduced diameter zone (128) and the transversal hole (131), the incoming fluid reaches the first room (124) of the plunger (120) and the pressure of the incoming fluid thus acting on the constraining surface (316) of the sealing seat (309) augments the force of the plunger-spring (106) in keeping the inflow orifice (201) sealed by the sealing surface (317) of the sealing seat (309). Also, the incoming fluid reaches to the top of the plunger (120) and exerts force on the mating end (121) which helps in keeping the inflow orifice (201) sealed by the sealing surface (317) of the sealing seat (309).

Pressure of the incoming fluid in the chamber (305) exerts a force, on top of the flow arrangement (200), in downward direction. This effects in pressing the flow arrangement (200) and further pressing the O-ring (206) against a protruded rim (311) to achieve sealing between one or more inlet ports (301) and an outlet port (303).

On energizing the solenoid coil (103), a magnetic path gets completed under the influence of a magnetic field created by the solenoid coil (103) and the plunger (120) moves upwards such that the neck (122) of the plunger (120) enters the room (119) in the armature (107). Consequent to a circumferential overlap between the armature (107) and the plunger (120) besides butting of end faces of the armature (107) and the plunger (120), the plunger (120) is held to the armature (107) by a larger number of magnetic lines of forces. Such construction is more immune to inadvertent dropping of the plunger (120) under vibration, even when the solenoid coil (103) is continuously energized. The upward movement of the plunger (120) upon energization of the solenoid coil (103), is against a force 'Fv' exerted by the varying diameter compression spring (110).

Figure 3C:
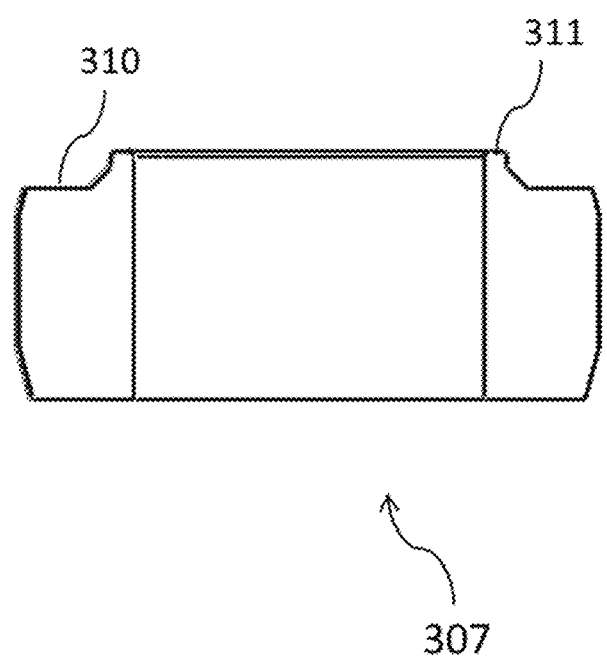

The dual valve assembly (102) comprises a valve body (300), FIG. 3A. An upper stopper ring (113) seen from FIG. 3B and a lower stopper ring (307) seen from FIG. 3C. On an inside of the valve body (300), a flow arrangement (200) is disposed that facilitates a normal flow control operation during energised and de-energised state of the solenoid assembly (104), as well as a bi-directional pressure relief operation during the de-energized state of the solenoid assembly (104).

The valve body (300) comprises one or more inlet ports (301), one or more exhaust ports (304), the outlet port (303), an upper seat (315), and an outlet seat (314). There is a disposition means (312) provided on a first end (313) of the valve body (300) to mount the valve body (300) on the external end (146) of the guide (112) to obtain the solenoid valve (100) with integral pressure relief arrangement as per present invention, FIG. 3A.

FIG. 3C, the lower stopper ring (307) has the protruded rim (311) and a third part profile (310). The upper stopper ring (113) sits on the upper seat (315) of the valve body (300) while the lower stopper ring (307) sits on the outlet seat (314) of the valve body (300), constraining the flow arrangement (200) between the upper stopper ring (113) and the lower stopper ring (307).

Figure 4A:
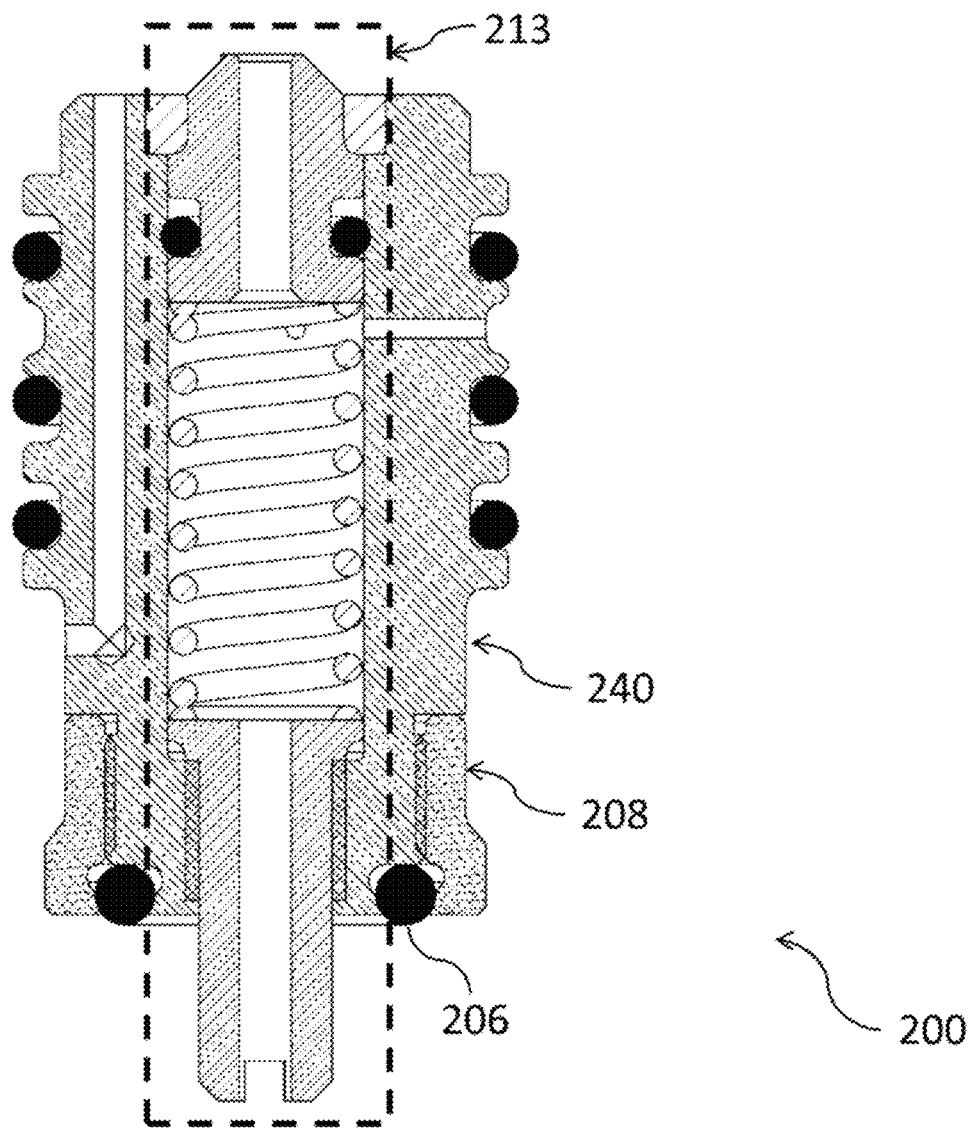
FIG. 4A shows a flow arrangement.
Figures 4B, 4C:
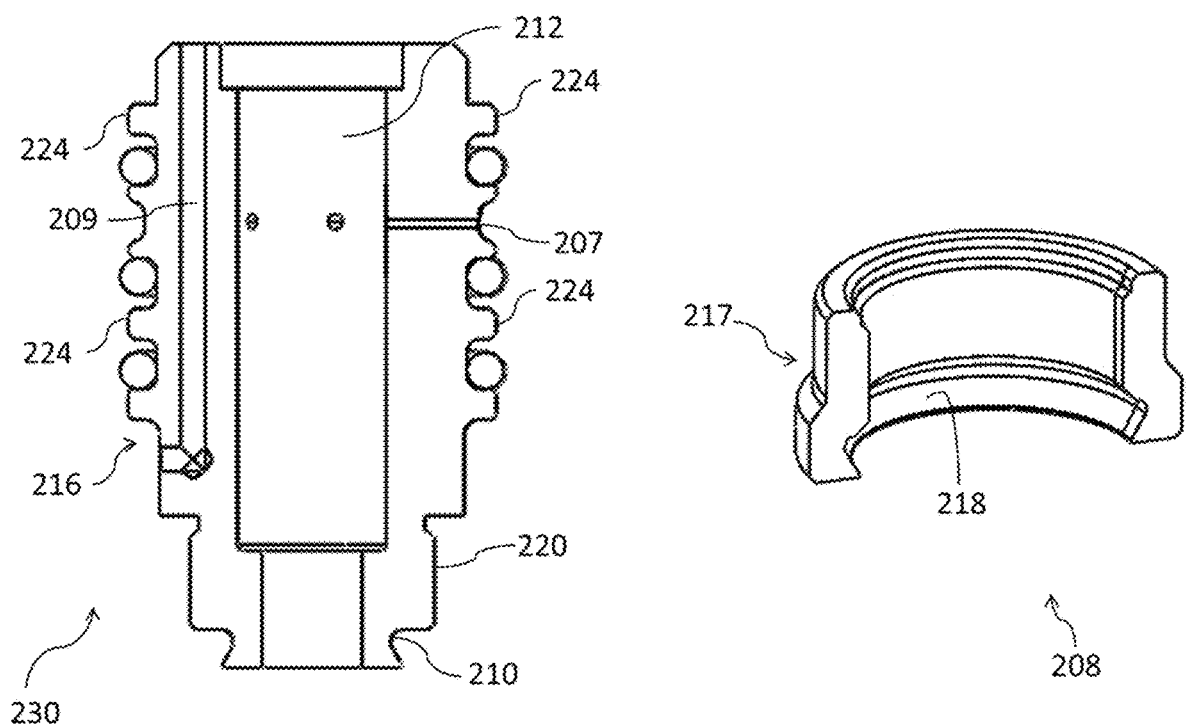
FIGS. 4B-4C show parts of the flow arrangement.

FIG. 4A, the flow arrangement (200) comprises a primary moving assembly (240) and a secondary moving assembly (213). FIG. 4B, the primary moving assembly (240) comprises a primary mover (230) and an O-ring holder (208). The primary mover (230) has a first bore (209), an exhaust bore (207), a tubular cavity (212), an engaging end (220), an annular groove (210) to hold a sealing O-ring (206) and a plurality of raised peripheral surfaces (224). There is provided a first part profile (216) on an outside face of the primary mover (230). FIG. 4C, the O-ring holder (208) comprises a second part profile (217) and a partial cavity (218).

When the primary mover (230), the O-ring holder (208) and the lower stopper ring (307) are disposed in the valve body (300), the first part profile (216), the second profile (217) and the third part profile (310) along with an inside of the valve body (300) form a channel (306) as seen in FIG. 1A. In addition, the sealing O-ring (206) is occupied in the annular groove (210) and the cavity (218). The primary mover (230) has the first bore (209) of an internal diameter less than the internal diameter of the channel (306).

Figure 4D:
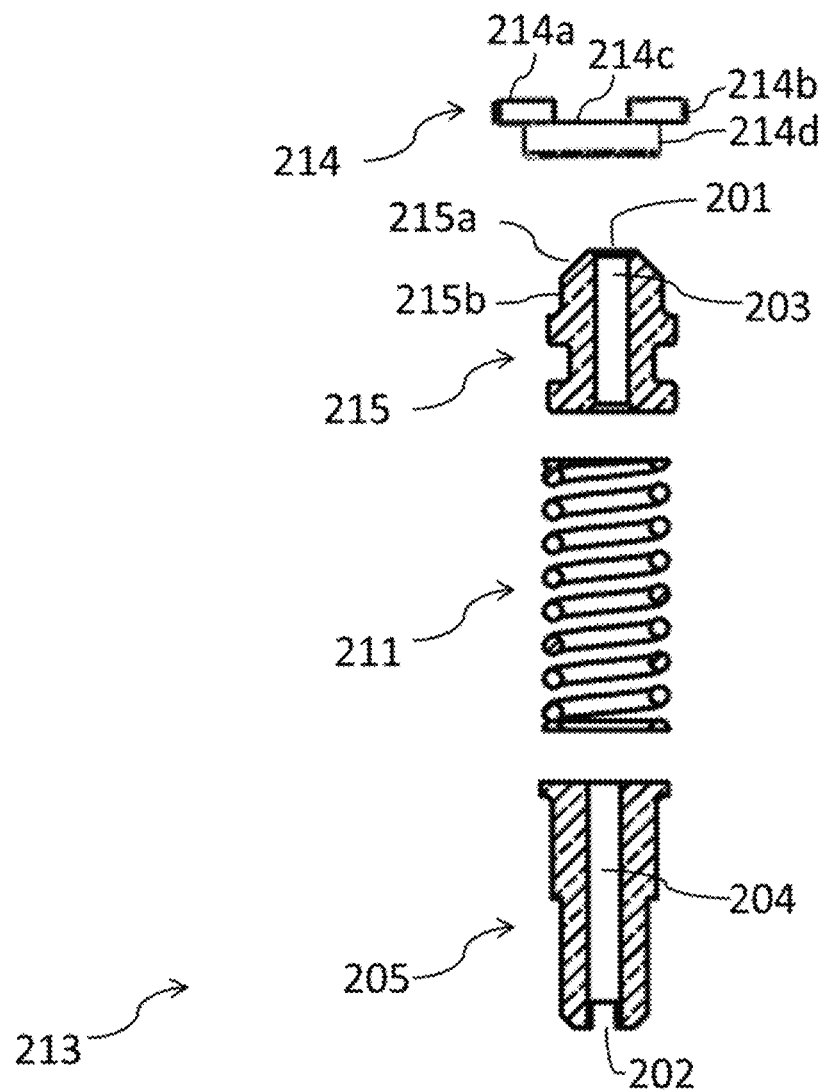
FIG. 4D shows an exploded view of a secondary moving assembly.

FIG. 4D, the secondary moving assembly (213) comprises a sliding member (215), a supporting ring (214), a pressure-relief spring (211) and a pressure-adjusting mechanism (205). The pressure-relief spring (211) is biased to the sliding member (215) and to the pressure-adjusting mechanism (205). The supporting ring (214) comprises a first platform (214a) and a second platform (214b) on a top surface (214c). The sliding member (215) comprises an inclined surface (215a) having an angle of inclination between 30° to 60° around an inflow orifice (201) followed by a second bore (203). The pressure-adjusting mechanism (205) comprises a third bore (204) and an outflow orifice (202).

Figure 4E:
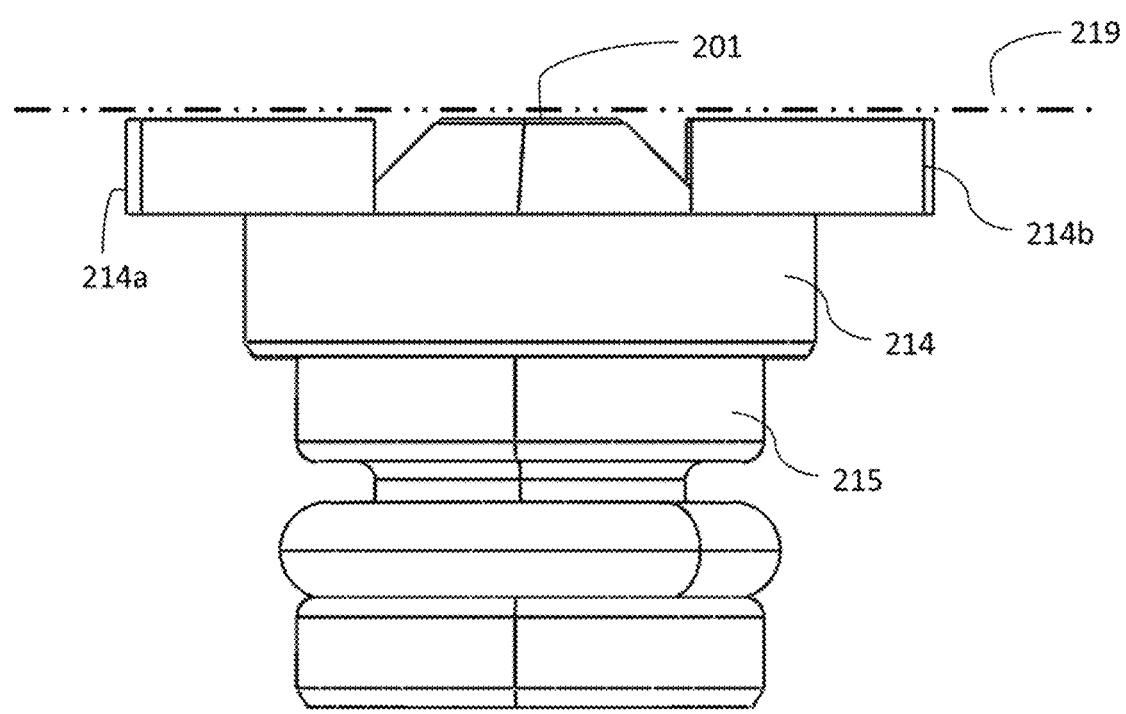
FIG. 4E shows a sliding member with a supporting ring.

The tubular cavity (212), as shown in FIG. 4B, of the primary mover (230) houses the secondary moving assembly (213). The supporting ring (214) is non-movably mounted in the tubular cavity (212) of the primary mover (230) such that an annular ring (214d) of the supporting ring (214) surrounds an annular region (215b) of the sliding member (215). The first platform (214a), the second platform (214b) and the inflow orifice (201) are coplanar (219) when the fluid pressure in the dual valve assembly (102) is within limits as seen in FIG. 4E. The pressure-adjusting spring (211) is mounted in between the sliding member (215) and the pressure adjusting mechanism (205). The pressure adjusting mechanism (205) can occupy different linear positions as per the application or system requirement, impacting a pre-compression length and therefore a force of the pressure-adjusting spring (211), wherein the pressure adjusting mechanism (205) may be a screw.

The flow arrangement (200) is slidably positioned in the dual valve assembly (102) such that the sealing O-ring (206) butts on the protruded rim (311) of the lower stopper ring (307) and forms a sealing point (308). The pressure-adjusting mechanism (205) extends out such that the outflow orifice (202) opens to the outlet port (303) of the dual valve assembly (102). The sliding member (215) of the secondary moving assembly (213) is adapted to independently slide inside the tubular cavity (212) depending on the pressure of the fluid and the pre-compression force of the pressure adjusting mechanism (205).

Figure 5A:
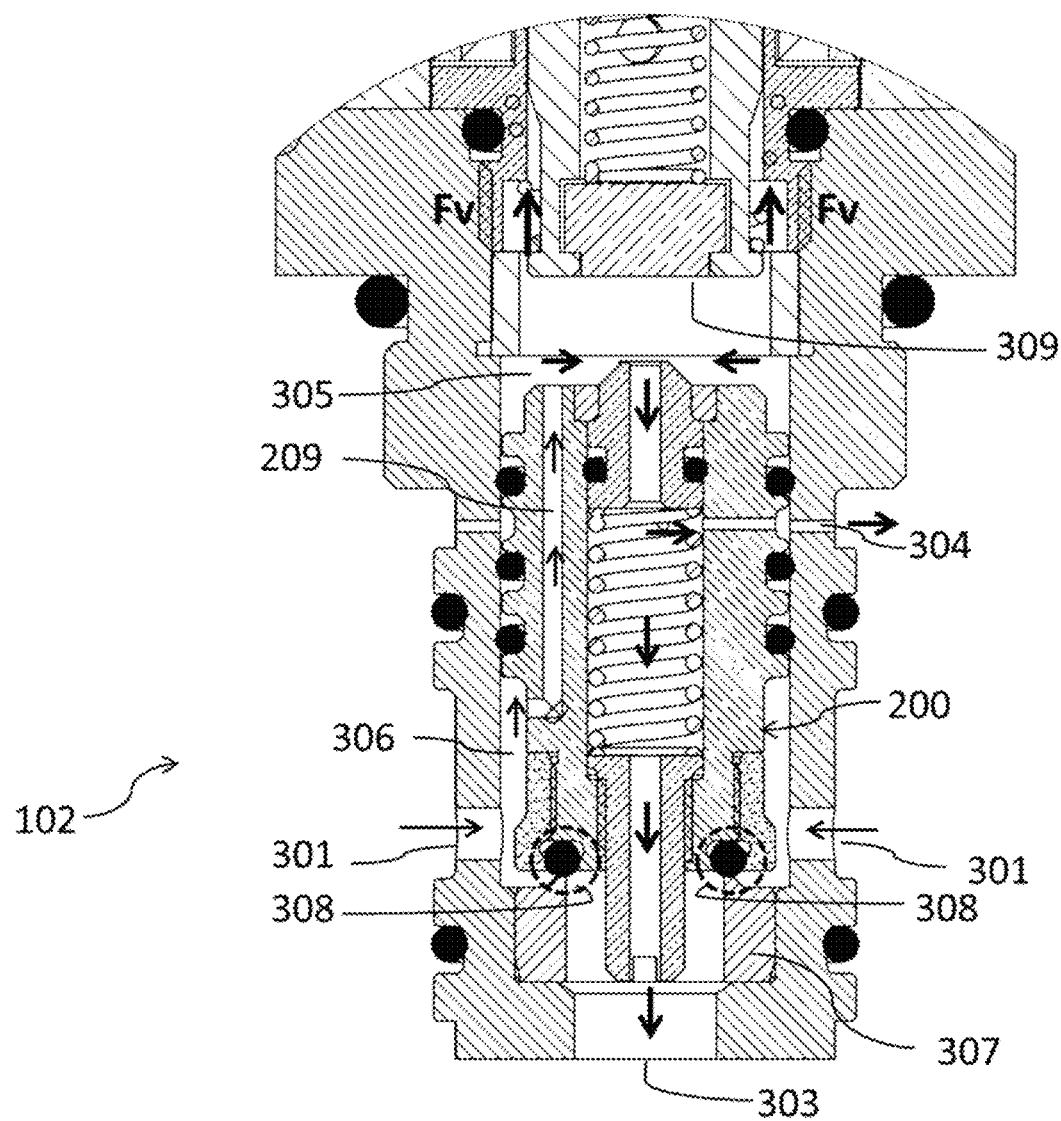
FIGS. 5A-5B illustrates the pressure-relief operation when the solenoid valve is in energised condition.

FIG. 5A, when the solenoid coil (103) is energised, the armature (107) attracts the plunger (120) such that the plunger (120) is pulled up against the varying diameter compression spring (110) force thus lifting the sealing seat (309) from the inflow orifice (201), uncovering the inflow orifice (201). As the sealing seat (309) is lifted, a chamber (305) is formed in the dual valve assembly (102). The fluid entering through the one or more inlet ports (301), fills the channel (306) then enters the first bore (209). The fluid, then, occupies the chamber (305) and enters the secondary moving assembly (213) through the inflow orifice (201). Further, the fluid flows through the second bore (203) followed by the third bore (204) and lastly to the outflow orifice (202) of the pressure-adjusting mechanism (205), some fluid also flows out through the exhaust bore (207) to the exhaust port (304).

Figure 5B:
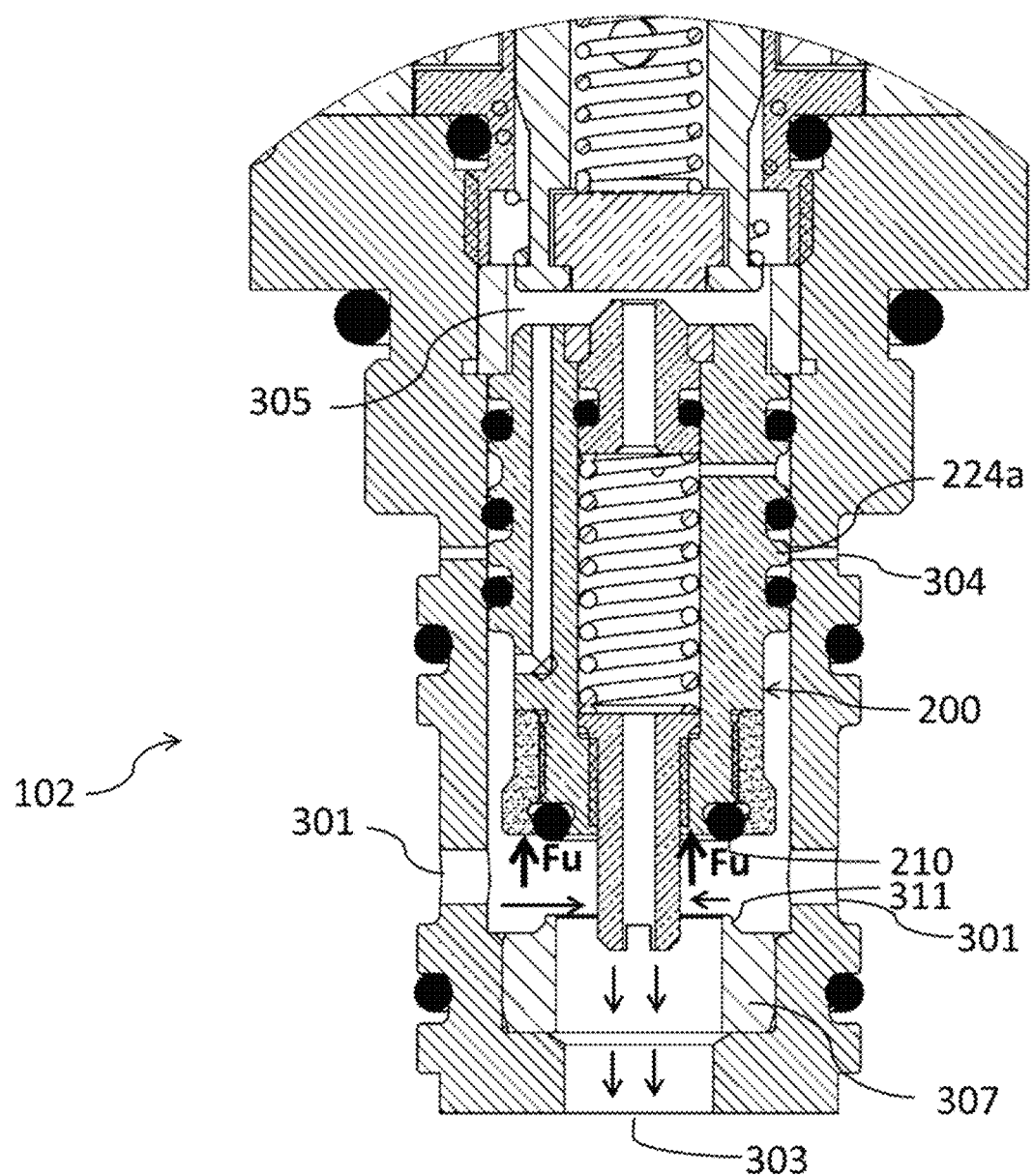
Figure 5C:
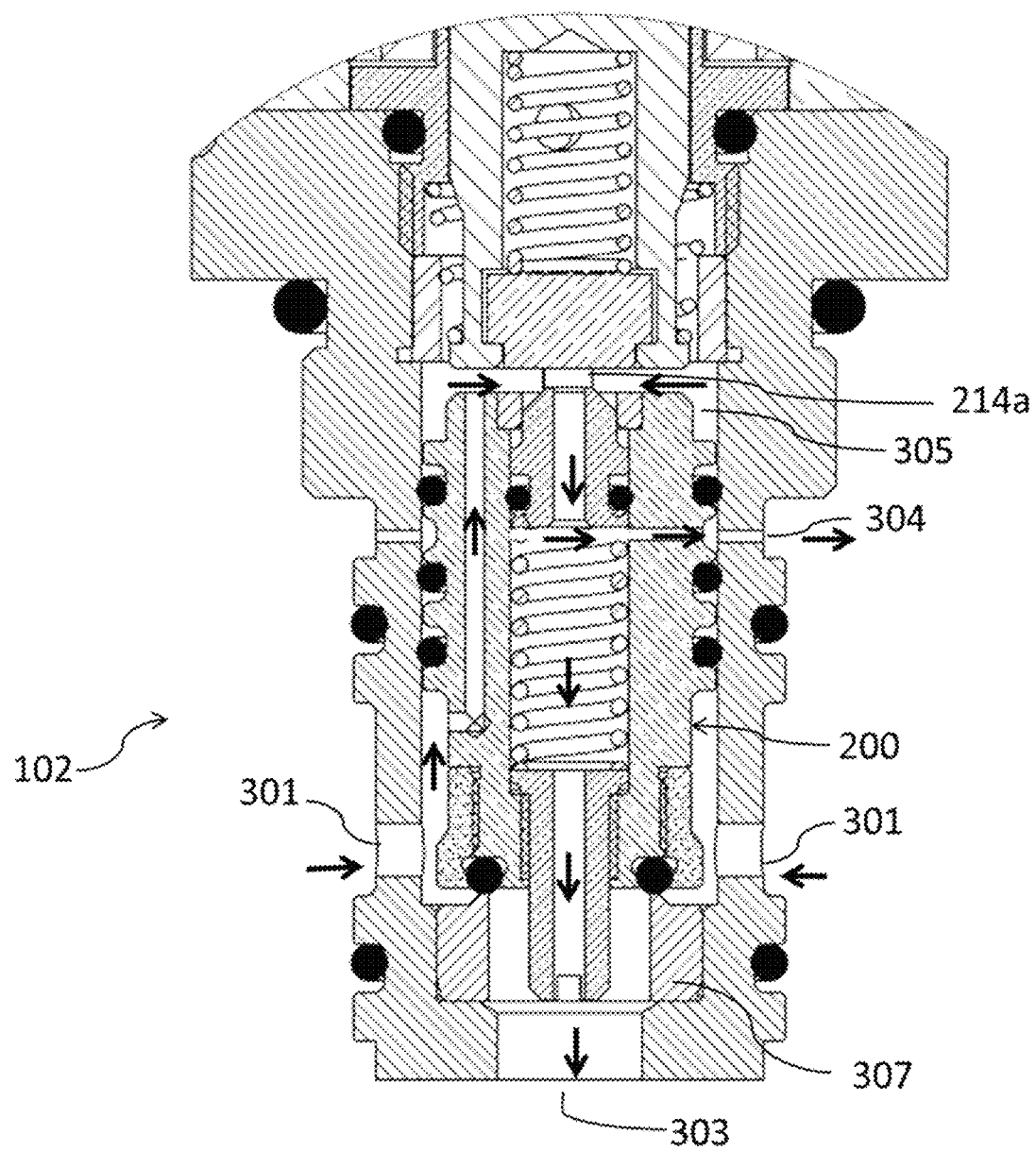
FIG. 5C illustrates the pressure-relief operation when the solenoid valve is in de-energised condition.

Simultaneously, the fluid also applies pressure on the sealing point (308). The chamber (305) initially empties faster than it fills due to the fluid exiting from the outlet port (303) as well as the exhaust port (304). Resultantly, the fluid pressure on the sealing point (308) exceeds the pressure in the chamber (305) and the flow arrangement (200) lifts up by an upward force Fu, in less than 100 ms of the flow commencing. As the flow arrangement (200) is lifted, the exhaust port (304) is blocked by the raised peripheral surface (224) of the primary mover (230), preventing further fluid flow from the exhaust port (304), FIG. 5B. In this manner, the solenoid valve (100) as per present invention releases an initial pressure spike In the absence of the electric supply, the solenoid coil (103) is de-energized resulting into the plunger (120) moving down rapidly due to the varying diameter compression spring (110). During the downward movement of the plunger (120), the sealing seat (309) falls on the platforms (214a and 214b) of the supporting ring (214) besides the inflow orifice (201). FIG. 5C shows a sectional view of the solenoid valve (100) wherein the sealing seat (309) has dropped on the first platform (214a) and blocking the inflow orifice (201) of the sliding member (215). The plunger-spring (106) absorbs the impact of the encounter of the rubber sealing seat (309) with the platforms (214a and 214b), reduces noise and increases mechanical life of the inflow orifice (201) of the sliding member (215).

Figure 5D:
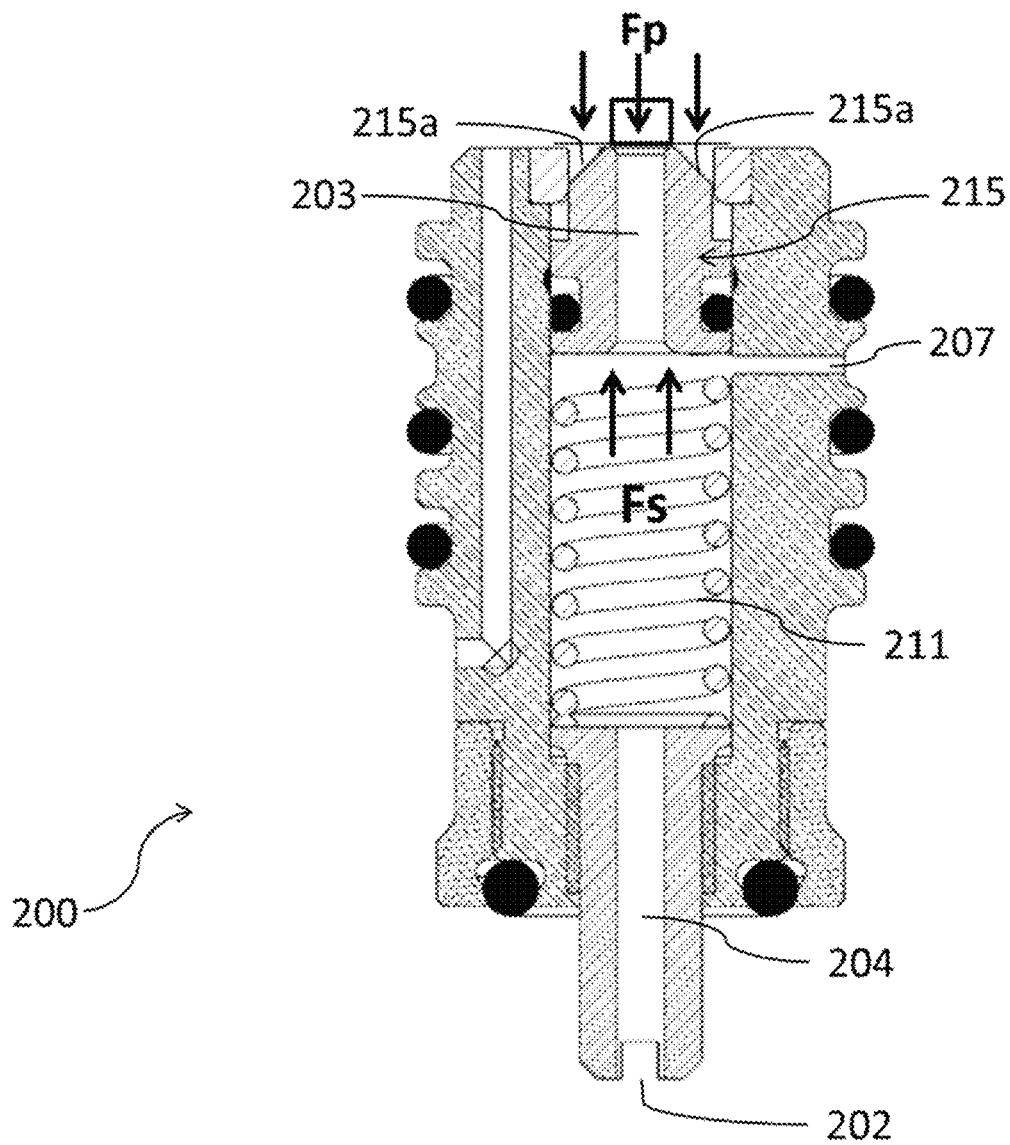
FIG. 5D illustrates the movement of a sliding member of the secondary moving assembly during excessive fluidic pressure in de-energised condition.

FIG. 5D, while the valve is close and the solenoid coil (103) is de-energized, if the fluid pressure from the one or more inlet ports (301) increases beyond a limit, such excess fluid pressure is also developed in the chamber (305) and gets exerted on the inclined surfaces (215a) of the sliding member (215). When a force Fp due to the fluid pressure exceeds the force 'Fs' due to pressure-relief spring (211), the sliding member (215) slides downward causing a gap between the sealing seat (309) and the inflow orifice (201). The fluid is then allowed to pass through the second bore (203) of the sliding member (215) followed by the third bore (204) of the pressure-adjusting mechanism (205) to the outlet port (303) of the dual valve assembly (102) via the outflow orifice (202). In this case, the exhaust bore (207) being already connected to the exhaust port (304), the fluid also flows out through the exhaust port (304) (as indicated in arrows), FIG. 5C. The fluid flow continues till the force 'Fp' becomes less than the force 'Fs'.

Figure 5E:
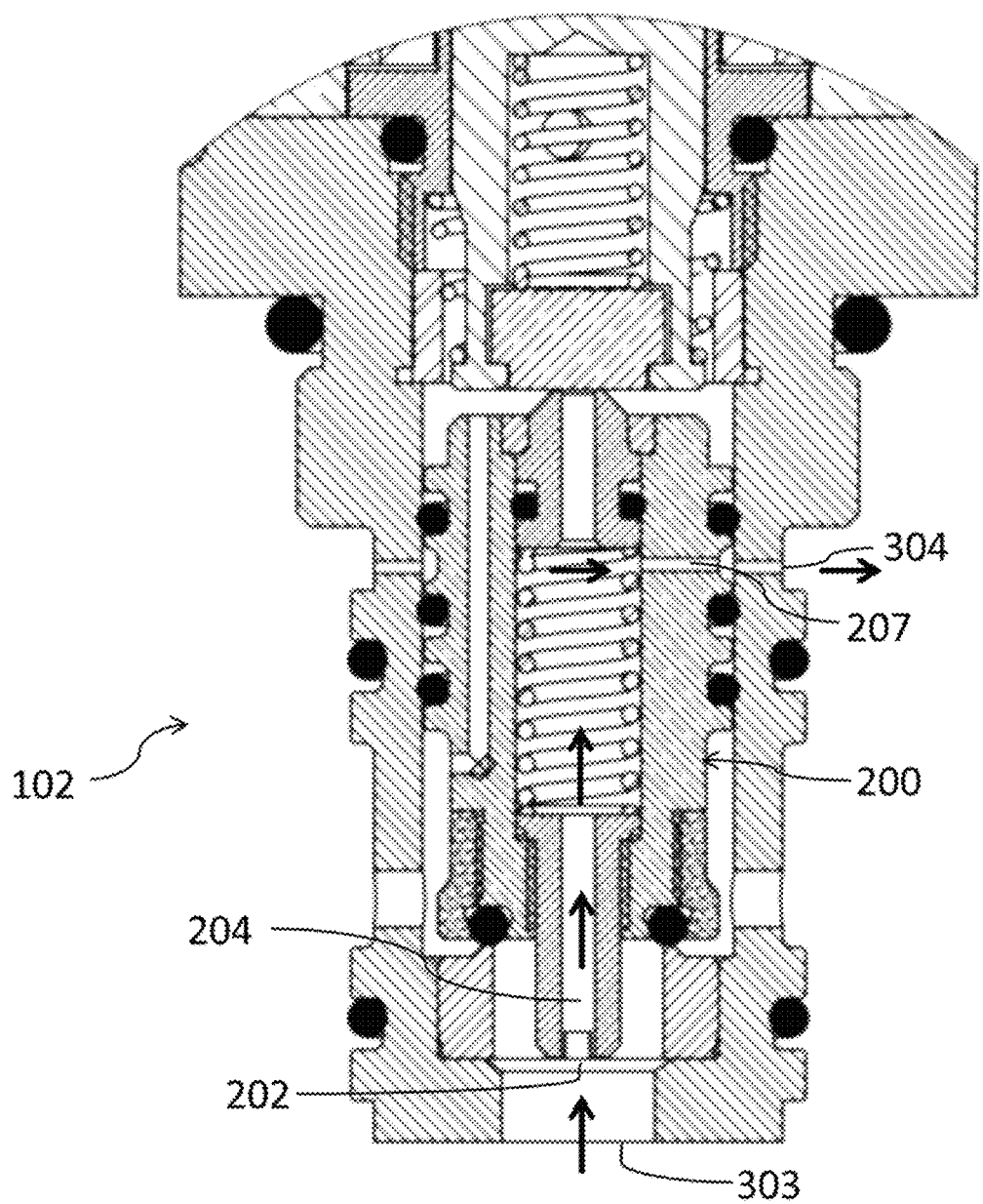
FIG. 5E illustrates a reverse fluidic flow when the solenoid valve is in de-energised condition.

FIG. 5E, a reverse fluid flow (as indicated in arrows), that is, from the outlet port (303) to the exhaust port (304) takes place, when the solenoid coil (103) is de-energised and an excessive pressure develops at the outlet port (303). As the solenoid coil (103) is de-energised, the sealing seat (309) covers the inflow orifice (201) of the sliding member (215) as seen in the Figure. In an event of reverse fluidic pressure through the dual valve assembly (102), the fluid enters through the outlet port (303), flows to the third bore (204) via outflow orifice (202) which is then released through the exhaust bore (207) of the flow arrangement (200) connecting to the exhaust port (304) of the dual valve assembly (102).

A mechanical clearance between the inner tubular wall (141) of the guide (112) and an external surface (132) of the plunger (120) is kept minimum, however any dust particles entering along with the fluid may get trapped there between and hamper smooth functioning. The plurality of longitudinal recesses (129) on the plunger (120) act as dust and dirt collectors and ensure trouble free operation.

I claim:

1. A solenoid valve (100) for fluid flow control and pressure relief, said solenoid valve comprising a solenoid assembly (104) and a dual valve assembly (102), the solenoid assembly (104) comprising:
   a C-Core (90) having a passing hole (93) at a far end (91) and at a near end (92);
      an armature (107) having a fixation means (118) on an outer surface (147) at an outer end (109) of the armature (107), and a room (119) at an inner end (117) of the armature (107);
      a plunger (120) with a reduced diameter zone (128), an inner flange (127), an outer flange (126), a first room (124), a second room (125), a plurality of longitudinal recesses (129), a transversal hole (131), a neck (122) and a mating end (121), having a plunger-spring (106), and a sealing seat (309) with a constraining surface (316) and a sealing surface (317);
      a solenoid coil (103); and
      a guide (112) having an inner tubular wall (141), an outer tubular wall (142), a flange (143) near an external end (146) of the outer tubular wall (142), a groove (145) on the outer side and a spring rest (144) on the inner side towards the external end (146);
   wherein the solenoid assembly is configured such that on energizing the solenoid coil, the plunger is linearly lifted up to configure the solenoid valve from a normally closed position to an open position;
the dual valve assembly (102) operatively coupled to the solenoid assembly and comprising:
   a valve body (300) with one or more inlet ports (301), an outlet port (303), an upper seat (315), and an outlet seat (314); an upper stopper ring (113); and
   a flow arrangement (200) disposed on an inside of the valve body (300);
   wherein the flow arrangement (200) comprises:
      a primary moving assembly (240) comprising a primary mover (230) slidably configured within a bore of the valve body (300) such that in the normally closed position of the solenoid valve, a lower end of the primary mover (230) closes the outlet port (303) of the valve body (300), wherein outer profile of the primary mover (230) is configured to provide an annular channel (306) between the flow arrangement (200) and the valve body (300) towards a lower end of the flow arrangement (200), the annular channel configured such that when the primary mover (230) slides upward lifting the lower end of the primary mover (230) off the outlet port (303) of the valve body (300), the channel (306) gets fluidically connected to the outlet port (303) of the valve body (300), and
   wherein the primary mover (230) comprises a first bore (209) that provides fluidic connectivity between the annular channel (306) and a chamber (305) above the flow arrangement (200); and
      a secondary moving assembly (213) comprising a sliding member (215) slidably housed within a tubular cavity (212) of the primary mover (230) such that in the normally closed position of the solenoid valve, an upper end of the sliding member (215) projects out of the primary mover, and a sealing seat (309) fitted at lower end of the plunger (120) rests against the upper end of the sliding member (215) to close an inflow orifice (201) of a second bore (203) of the sliding member (215), said second bore (203) of the sliding member (215) being in fluidic communication with the outlet port (303) of the valve body (300) through the tubular cavity (212) of the primary mover (230), and wherein the sliding member (215) is biased by a pressure-relief spring (211) towards the upper end of the primary mover (230);
   wherein when the solenoid coil (103) is energized the plunger (120) is lifted resulting in opening of the inflow orifice (201) for fluid flow from the inlet port (301) to the outlet port (303) through the channel (306), the first bore (209), the chamber (305), second bore (203) of the sliding member (215), and the tubular cavity (212) of the valve body (300), and as fluid pressure the chamber (305) reduces as a result of passage of fluid through the second bore (203) of the sliding member (215) and the tubular cavity (212) of the valve body (300), higher pressure on the lower side of the sliding mover (230) results in the flow arrangement (200) moving up resulting the lower end of the primary mover (230) moving away from the outlet port (303) to establish direct fluidic connectivity between the inlet port (301) and the outlet port (303) through the channel (306) for faster flow of the fluid; and
wherein in event of excessive fluid pressure at the inlet port (301), above a pre-defined limit, when the solenoid valve is in normally closed position, the fluid pressure from the inlet port (301) reaches the chamber (305) through the channel (306) and the first bore (209) and the fluid pressure on the upper side of the sliding member (215) overcomes the biasing force of the pressure-relief spring (211) to move the sliding member (215) to open the inflow orifice (201) to allow the fluid to move from the inlet port (301) to the outlet port (303) through the channel (306), the first bore (209), the chamber (305), second bore (203) of the sliding member (215), and the tubular cavity (212) of the valve body (300) to relive the excessive fluid pressure.

2. The solenoid valve (100) for fluid flow control and pressure relief as claimed in claim 1, wherein the armature (107) is assembled with the guide (112) by an interference fit between the inner tubular wall (141) of the guide (112) and the outer surface (147) of the armature (107).

3. The solenoid valve (100) for fluid flow control and pressure relief as claimed in claim 1, wherein the plunger (120) is slidably situated in the guide (112) such that the plunger (120) is always surrounded by the near end (92) of the C-Core (90).

4. The solenoid valve (100) for fluid flow control and pressure relief as claimed in claim 1, wherein the plunger-spring (106), is accommodated in the first room (124) of the plunger (120), pre-compressed by the sealing seat (309), which is retained in the second room (125) of the plunger (120) by the inner flange (127) of the plunger (120).

5. The solenoid valve (100) for fluid flow control and pressure relief as claimed in claim 1, wherein the plunger (120) has a varying diameter compression spring (110) located around the reduced diameter zone (128) of the plunger (120) with a lower end of the varying diameter compression spring (110) supported on the outer flange (126) to bias the plunger downwards towards the upper end of the sliding member (215) to close the inflow orifice (201) in the normally closed position of the solenoid valve.

6. The solenoid valve (100) for fluid flow control and pressure relief as claimed in claim 5, wherein a largest diameter end (115) of the varying diameter compression spring (110) sit on rests against the spring rest (144) of the guide (112).

7. The solenoid valve (100) for fluid flow control and pressure relief as claimed in claim 1, wherein the sealing seat (309) is made of a rubber of durometer scale hardness more than 40.

8. The solenoid valve (100) for fluid flow control and pressure relief as claimed in claim 1, wherein the plunger-spring (106) absorbs an impact of encounter of the sealing seat (309) with a platform (214a, 214b) of a supporting ring (214) located at upper end of the tubular cavity (212) of the primary moving assembly (240), when the solenoid coil (103) is de-energized.

9. The solenoid valve (100) for fluid flow control and pressure relief as claimed in claim 8, wherein the plunger-spring (106) reduces noise by absorbing the impact of encounter of the sealing seat (309) with a platform (214a, 214b) when the solenoid coil (103) is de-energized.

10. The solenoid valve (100) for fluid flow control and pressure relief as claimed in claim 1, wherein a supporting ring (214) non-movably mounted in a recess at upper end of the tubular cavity (212) of the primary moving assembly (240) includes an annular ring (214d) that surrounds an annular region (215b) of the sliding member (215), and a platform (214a, 214b), wherein the platform (214a, 214b) of the supporting ring (214) and the inflow orifice (201) of the sliding member (215) are coplanar when the fluid pressure in the dual valve assembly (102) is within limits so that an impact of the sealing seat (309) with the inflow orifice (201) of the sliding member (215) is shared by the platform (214a, 214b) of the supporting ring (214) thereby increasing mechanical life of the inflow orifice (201) of the sliding member (215), and wherein the platform (214a, 214b) projects above the upper end of the primary mover (230) to create the chamber (305) above the flow arrangement (200).

11. The solenoid valve (100) for fluid flow control and pressure relief as claimed in claim 1, wherein the primary mover (230) includes an exhaust bore (207) that, in the normally closed position of the solenoid valve, is in fluidic communication with an exhaust port (304) of the valve body (301), and when the solenoid coil (103) is energized, fluid exits from the outlet port (303) as well as the exhaust port (304) resulting in the chamber (305) initially emptying faster.

12. The solenoid valve (100) for fluid flow control and pressure relief as claimed in claim 1, wherein the plunger (120) includes a reduced diameter zone (128) and a transversal hole (131) which provide a passage for the fluid from the chamber (305) to reach the first room (124) of the plunger (120) and wherein the incoming fluid pressure acting on a constraining surface (316) of the sealing seat (309) augments the force of the plunger-spring (106) to keep the inflow orifice (201) sealed by the sealing surface (317) of the sealing seat (309).

13. The solenoid valve (100) for fluid flow control and pressure relief as claimed in claim 1, wherein the sealing seat (309) has an assembly relief (318) for facilitating elastic deformation during assembly.

14. The solenoid valve (100) for fluid flow control and pressure relief as claimed in claim 1, wherein the secondary moving assembly (213) includes a pressure adjusting mechanism (205) located within the primary mover (203) in threaded engagement, with a lower end of the pressure-adjusting spring (211) resting against the pressure adjusting mechanism (205) such that linear movement of the pressure adjusting mechanism (205) through the threaded engagement of the pressure adjusting mechanism (205) results in change in length of the pressure-adjusting spring (211) and thereby the biasing force on the sliding member (215).

15. The solenoid valve (100) for fluid flow control and pressure relief as claimed in claim 14, wherein the pressure adjusting mechanism (205) is a screw.

16. The solenoid valve (100) for fluid flow control and pressure relief as claimed in claim 1, wherein the flow arrangement (200) includes an O-ring holder (208) fitted at lower end of the primary mover (230) to hold a sealing O-ring (206) in an annular groove (210) at the lower end of the primary mover (230).

17. The solenoid valve (100) for fluid flow control and pressure relief as claimed in claim 11, when wherein, in the normally closed position of the solenoid valve, excessive fluid pressure at the outlet port (303) is relieved by a reverse fluid flow from the outlet port (303) to the exhaust port (304) via exhaust bore (207).

18. The solenoid valve (100) for fluid flow control and pressure relief as claimed in claim 14, wherein the pressure adjusting mechanism (205) comprises a third bore (204) that provides fluidic connectivity between the tubular cavity (212) of the primary mover (230) and the outlet port (303) for flow of the fluid.

19. The solenoid valve (100) for fluid flow control and pressure relief as claimed in claim 11, wherein the first bore (209) of the primary mover (230) has an internal diameter smaller than cross section of the channel (306) resulting in slow filling of the chamber (305), which, coupled with the chamber (305) initially emptying faster, results in drop in pressure in the chamber (305) compared to pressure in the channel (306) to make the flow arrangement (200) lift up to open the outlet port (303) in less than 100 ms of the flow commencing.

20. The solenoid valve (100) for fluid flow control and pressure relief as claimed in claim 16, wherein the valve body (300) includes an annular shaped lower stopper ring (307) fitted at lower end of the valve body (300) such that inside of the annular shaped lower stopper ring (307) is in fluidic coupling with the outlet port (303), the lower stopper ring (307) having a protruded rim (311) on upper side, and wherein in the normally closed position of the solenoid valve (100), the sealing O-ring (206) fitted at the lower end of the primary mover (230) rests against the protruded rim (311) to close fluidic coupling of the channel (306) with the outlet port (303).

* * * * *